United States Patent
Maeno et al.

(10) Patent No.: US 8,227,080 B2
(45) Date of Patent: *Jul. 24, 2012

(54) CARBON NANOTUBE AGGREGATE

(75) Inventors: Youhei Maeno, Ibaraki (JP); Yoshikazu Nakayama, Suita (JP); Kaori Hirahara, Suita (JP)

(73) Assignee: Nitto Denko Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/058,236

(22) PCT Filed: Jun. 19, 2009

(86) PCT No.: PCT/JP2009/061187
§ 371 (c)(1), (2), (4) Date: Feb. 9, 2011

(87) PCT Pub. No.: WO2010/032525
PCT Pub. Date: Mar. 25, 2010

(65) Prior Publication Data
US 2011/0133135 A1    Jun. 9, 2011

(30) Foreign Application Priority Data
Sep. 18, 2008 (JP) ................ 2008-238853

(51) Int. Cl.
*B32B 7/12* (2006.01)
(52) U.S. Cl. ........ 428/332; 428/343; 428/364; 428/397; 428/398; 977/742; 977/752; 977/753
(58) Field of Classification Search .......... 428/332, 428/364, 397, 398, 343; 977/742, 752, 753
See application file for complete search history.

(56) References Cited

U.S. PATENT DOCUMENTS

| | | | |
|---|---|---|---|
| 6,924,335 B2 | 8/2005 | Fan et al. | |
| 6,965,513 B2 | 11/2005 | Montgomery et al. | |
| 7,393,428 B2 | 7/2008 | Huang et al. | |
| 7,641,938 B2 | 1/2010 | Liu et al. | |
| 8,064,203 B2 * | 11/2011 | Fairbank et al. | 361/708 |
| 2003/0117770 A1 | 6/2003 | Montgomery et al. | |
| 2004/0097635 A1 | 5/2004 | Fan et al. | |
| 2007/0244245 A1 | 10/2007 | Liu et al. | |
| 2008/0074847 A1 | 3/2008 | Sueoka et al. | |
| 2008/0087646 A1 | 4/2008 | Liu et al. | |
| 2008/0128122 A1 * | 6/2008 | Huang et al. | 165/185 |

FOREIGN PATENT DOCUMENTS

| | | |
|---|---|---|
| JP | 2003-249613 A | 9/2003 |
| JP | 2004-161996 A | 6/2004 |
| JP | 2006-147801 A1 | 6/2006 |
| JP | 2006-270041 A | 10/2006 |
| JP | 2007-284679 A | 11/2007 |
| WO | 2008/035742 A1 | 3/2008 |

* cited by examiner

*Primary Examiner* — Matthew Matzek
(74) *Attorney, Agent, or Firm* — Sughrue Mion, PLLC

(57) ABSTRACT

Provided is a composite material useful as a material for a thermal contact surface in a microprocessor which can express extremely high thermal diffusion property and extremely high conductivity, can express a sufficient adhesive strength in its surface, and is excellent in reworking property at the time of a bonding operation. The carbon nanotube aggregate of the present invention is a carbon nanotube aggregate where a plurality of carbon nanotubes each having a plurality of walls penetrate a resin layer in a thickness direction of the resin layer, in which both terminals of the carbon nanotube aggregate each have a shear adhesive strength for glass at 25° C. of 15 N/cm$^2$ or more.

8 Claims, 7 Drawing Sheets

CARBON NANOTUBE AGGREGATE

TECHNICAL FIELD

The present invention relates to a carbon nanotube aggregate, and more specifically, to a carbon nanotube aggregate having excellent pressure-sensitive adhesive property. In addition, the present invention relates to various sheets each using such carbon nanotube aggregate.

BACKGROUND ART

Carbon nanotubes (CNT's) each have good thermal diffusion property and good conductivity. In view of the foregoing, an investigation has been conducted on a composite material using any one of the carbon nanotubes as a material for a thermal contact surface in a microprocessor.

An investigation has been conducted on a composite material containing a polymer material and a plurality of carbon nanotubes as a composite material useful as the material for a thermal contact surface in a microprocessor. The composite material is such that the plurality of carbon nanotubes are engaged in the polymer material in a vertical direction. High thermal diffusion property and high conductivity can be expressed as a result of such engagement of the plurality of carbon nanotubes in the polymer material in the vertical direction as described above (see Patent Literature 1).

The above-mentioned composite material utilizes the following characteristics (see the paragraph 0029 of Patent Literature 1). A carbon nanotube has good conductivity, and the carbon nanotube has a thermal conductivity in its lengthwise direction larger than a thermal conductivity in a direction vertical to the lengthwise direction.

Although the thermal diffusion property and the conductivity that can be expressed by the composite material described in Patent Literature 1 are at somewhat high levels, the composite material has been unable to express sufficiently high thermal diffusion property and sufficiently high conductivity when the composite material is assumed to be actually used as a material for a thermal contact surface in a microprocessor.

In addition, when the above-mentioned composite material is used as a material for a thermal contact surface in a microprocessor, the composite material is requested to be placed between the surfaces of two devices (such as a heat spreader and a heat sink) and surely fixed. Accordingly, the composite material is requested to be sufficiently bonded to the surface of each device. Further, in the above-mentioned production process for the microprocessor, the following need may arise. The two devices placed through the composite material is requested to be peeled and attached again for the purpose of, for example, the correction of a placement shift. Accordingly, the composite material is requested to be excellent in reworking property from the surface of each device (in other words, it is requested that the composite material can be easily peeled and bonded again without any adhesive residue).

As described above, no such composite material useful as a material for a thermal contact surface in a microprocessor as described below has been obtained yet. The composite material can express extremely high thermal diffusion property and extremely high conductivity, can express a sufficient adhesive strength in its surface, and is excellent in reworking property at the time of a bonding operation.

Patent Literature 1: JP 2007-284679 A

SUMMARY OF INVENTION

Technical Problem

An object of the present invention is to provide a composite material useful as a material for a thermal contact surface in a microprocessor which can express extremely high thermal diffusion property and extremely high conductivity, can express a sufficient adhesive strength in its surface, and is excellent in reworking property at the time of a bonding operation.

Solution to Problem

A carbon nanotube aggregate of the present invention is a carbon nanotube aggregate where a plurality of carbon nanotubes each having a plurality of walls penetrate a resin layer in a thickness direction of the resin layer, in which both terminals of the carbon nanotube aggregate each have a shear adhesive strength for glass at 25° C. of 15 N/cm$^2$ or more.

In a preferred embodiment, exposed portions of the above-mentioned carbon nanotubes from the above-mentioned resin layer each have a length of 300 μm or more.

In a preferred embodiment, the distribution width of the wall number distribution of the carbon nanotubes each having the plurality of walls described above is 10 walls or more, and the relative frequency of the mode of the wall number distribution is 25% or less.

In a preferred embodiment, the mode of the wall number distribution described above is present within a wall number range of 2 to 10.

In a preferred embodiment, the mode of the wall number distribution of the carbon nanotubes each having the plurality of walls described above is present at a wall number of 10 or less, and the relative frequency of the mode is 30% or more.

In a preferred embodiment, the mode of the wall number distribution described above is present at a wall number of 6 or less.

According to another aspect of the present invention, there is provided a thermal diffusion sheet. The thermal diffusion sheet of the present invention uses the carbon nanotube aggregate of the present invention.

According to another aspect of the present invention, there is provided a conductive sheet. The conductive sheet of the present invention uses the carbon nanotube aggregate of the present invention.

Advantageous Effects of Invention

According to the present invention, there can be provided a composite material useful as a material for a thermal contact surface in a microprocessor which can express extremely high thermal diffusion property and extremely high conductivity, can express a sufficient adhesive strength in its surface, and is excellent in reworking property at the time of a bonding operation. There can also be provided an application where such effects of the composite material can be sufficiently expressed.

In the present invention, provided is a carbon nanotube aggregate where a plurality of carbon nanotubes each having a plurality of walls penetrate a resin layer in its thickness direction, and carbon nanotubes having specific structures (such as wall numbers, a wall number distribution, and lengths) are designed and used as the carbon nanotubes. As a result, the carbon nanotube aggregate can express such marked effects as described below. The carbon nanotube aggregate provides extremely high levels of thermal diffusion property and conductivity, can express a sufficient adhesive strength in its surface, and is excellent in reworking property at the time of a bonding operation.

DESCRIPTION OF EMBODIMENTS

[Carbon Nanotube Aggregate]

Figure 1:
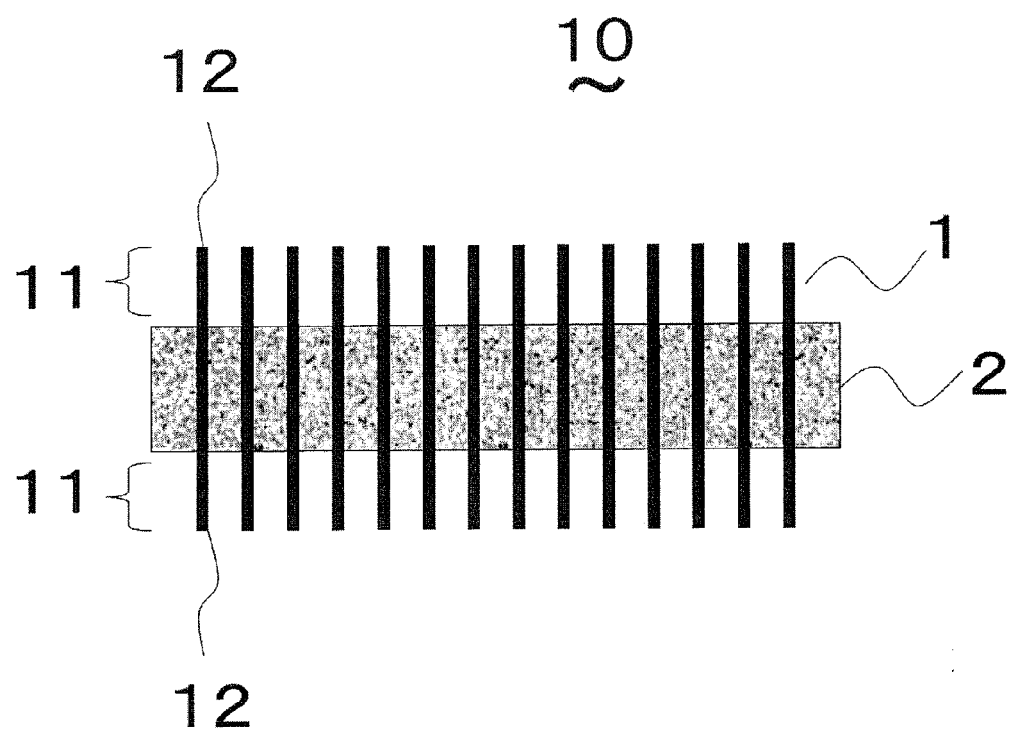
FIG. 1 is a schematic sectional view of a carbon nanotube aggregate in a preferred embodiment of the present invention.

FIG. 1 illustrates a schematic sectional view of a carbon nanotube aggregate in a preferred embodiment of the present invention (the view is not precisely illustrated to scale in order that each constituent portion may be clearly illustrated).

In a carbon nanotube aggregate 10 of the present invention, a plurality of carbon nanotubes 1 each having a plurality of walls penetrate a resin layer 2 in its thickness direction. The plurality of carbon nanotubes 1 each having the plurality of walls expose exposed portions 11 from each of both surfaces of the resin layer 2. The exposed portions 11 each have a tip portion 12.

The carbon nanotube aggregate 10 of the present invention can express extremely high thermal diffusion property and extremely high conductivity, can express a sufficient adhesive strength in its surface, and is excellent in reworking property at the time of a bonding operation because the carbon nanotube aggregate has such structure as described above.

With regard to the lengths of the exposed portions 11 in the carbon nanotube aggregate 10 of the present invention, the content of exposed portions each having a length of 300 μm or more in all the exposed portions 11 is preferably 80 to 100%, more preferably 90 to 100%, still more preferably 95 to 100%, particularly preferably to 100%, most preferably substantially 100%. The phrase "substantially 100%" as used herein refers to a state in which the content is 100% in a detection limit in a measuring instrument.

The length of each of the exposed portions 11 in the carbon nanotube aggregate 10 of the present invention is particularly preferably 300 μm or more. When the length of each of the exposed portions 11 is 300 μm or more, more specifically, the length is preferably 300 to 10,000 μm, more preferably 300 to 5,000 μm, still more preferably 300 to 2,000 μm, particularly preferably 300 to 1,000 μm. When the length of each of the exposed portions 11 is less than 300 μm, the carbon nanotube aggregate 10 of the present invention may be unable to express extremely high thermal diffusion property and extremely high conductivity, may be unable to express a sufficient adhesive strength in its surface, and may be poor in reworking property at the time of a bonding operation.

In the carbon nanotube aggregate 10 of the present invention, the shear adhesive strength for glass at 25° C. of each of both terminals of the carbon nanotube aggregate 10, that is, the shear adhesive strength for glass at 25° C. of each of the tip portions 12 of the carbon nanotubes 1 each having the plurality of walls is 15 N/cm$^2$ or more. The above-mentioned shear adhesive strength for glass is preferably 15 to 200 N/cm$^2$, more preferably 20 to 200 N/cm$^2$, still more preferably 25 to 200 N/cm$^2$, particularly preferably 30 to 200 N/cm$^2$. When the above-mentioned shear adhesive strength for glass is less than 15 N/cm$^2$, the carbon nanotube aggregate 10 of the present invention may be unable to express a sufficient adhesive strength in its surface.

A layer formed of any appropriate resin can be adopted as the resin layer 2 in the carbon nanotube aggregate 10 of the present invention. Examples of the above-mentioned resin include an acrylic resin, a urethane resin, an epoxy resin, a polycarbonate resin, a PET resin, a polyimide resin, a polyethylene resin, and a polypropylene resin.

Any appropriate thickness can be adopted as the thickness of the resin layer 2 in the carbon nanotube aggregate 10 of the present invention depending on purposes and applications. For example, when the carbon nanotube aggregate of the present invention is used in a thermal diffusion sheet or a conductive sheet, the thickness is preferably 5 to 2,000 μm, more preferably 5 to 1,500 μm, still more preferably 10 to 1,000 μm, particularly preferably 20 to 500 μm.

The carbon nanotube aggregate of the present invention has such a characteristic as to be excellent in reworking property at the time of a bonding operation (i.e., such a characteristic that the carbon nanotube aggregate can be easily peeled and bonded again without any adhesive residue). When the carbon nanotube aggregate of the present invention is used as a material for a thermal contact surface in a microprocessor, by virtue of the presence of the characteristic, the carbon nanotube aggregate of the present invention can be easily peeled and bonded again without any adhesive residue in the case of the occurrence of a placement shift upon placement of the carbon nanotube aggregate between the surfaces of two devices (such as a heat spreader and a heat sink).

The above-mentioned reworking property can be represented by a peeling angle and an adhesion strength. For example, when a laminate obtained by crimping the carbon nanotube aggregate of the present invention onto a polypropylene resin (having a thickness of 25 μm) (by reciprocating a 5-kg cylinder roller once) is peeled at a peeling speed of 50 mm/min, the carbon nanotube aggregate of the present invention preferably has an adhesion strength of 1 N/10 mm or less at a peeling angle (angle formed between the carbon nanotube aggregate of the present invention and the polypropylene resin) of 15° or more. A lower limit for the adhesion strength at a peeling angle of 15° is preferably as small as possible because the ease with which the laminate is peeled increases as the lower limit reduces. For example, the lower limit is preferably 0.01 N/10 mm.

One preferred embodiment of the carbon nanotube aggregate of the present invention (which may hereinafter be referred to as "first preferred embodiment") is the following carbon nanotube aggregate where a plurality of carbon nanotubes each having a plurality of walls penetrate a resin layer in its thickness direction. Both terminals of the carbon nanotube aggregate each have a shear adhesive strength for glass at 25° C. of 15 N/cm$^2$ or more, the distribution width of the wall number distribution of the carbon nanotubes each having the plurality of walls is 10 walls or more, and the relative frequency of the mode of the wall number distribution is 25% or less.

The distribution width of the wall number distribution of the carbon nanotubes each having the plurality of walls described above is more preferably 10 to 30 walls, still more preferably 10 to 25 walls, particularly preferably 10 to 20 walls.

The "distribution width" of the wall number distribution of the carbon nanotubes each having the plurality of walls described above refers to a difference between the maximum wall number and minimum wall number of the wall numbers of the carbon nanotubes each having the plurality of walls.

In the first preferred embodiment of the carbon nanotube aggregate of the present invention, the distribution width of the wall number distribution of the carbon nanotubes each having the plurality of walls falls within the above-mentioned range. As a result, the carbon nanotube aggregate can express additionally extremely high thermal diffusion property and additionally extremely high conductivity, can express an additionally sufficient adhesive strength in its surface, and is additionally excellent in reworking property at the time of a bonding operation.

The wall numbers and wall number distribution of the carbon nanotubes in the present invention have only to be measured with any appropriate apparatus. The measurement is preferably performed with a scanning electron microscope (SEM) or a transmission electron microscope (TEM). For example, at least ten, or preferably twenty or more, carbon nanotubes out of the carbon nanotube aggregate have only to be evaluated for their wall numbers and wall number distribution by measurement with the SEM or TEM.

The above-mentioned maximum wall number is preferably 5 to 30, more preferably 10 to 30, still more preferably 15 to 30, particularly preferably 15 to 25. The above-mentioned minimum wall number is preferably 1 to 10, more preferably 1 to 5.

In the first preferred embodiment of the carbon nanotube aggregate of the present invention, the maximum wall number and minimum wall number of the wall numbers of the carbon nanotubes fall within the above-mentioned ranges. As a result, the carbon nanotube aggregate can express additionally extremely high thermal diffusion property and additionally extremely high conductivity, can express an additionally sufficient adhesive strength in its surface, and is additionally excellent in reworking property at the time of a bonding operation.

The relative frequency of the mode of the wall number distribution described above is more preferably 1 to 25%, still more preferably 5 to 25%, particularly preferably 10 to 25%, most preferably 15 to 25%.

In the first preferred embodiment of the carbon nanotube aggregate of the present invention, the relative frequency of the mode of the wall number distribution falls within the above-mentioned range. As a result, the carbon nanotube aggregate can express additionally extremely high thermal diffusion property and additionally extremely high conductivity, can express an additionally sufficient adhesive strength in its surface, and is additionally excellent in reworking property at the time of a bonding operation.

The mode of the wall number distribution described above is present within the wall number range of preferably 2 to 10, more preferably 3 to 10.

In the first preferred embodiment of the carbon nanotube aggregate of the present invention, the mode of the wall number distribution falls within the above-mentioned range. As a result, the carbon nanotube aggregate can express additionally extremely high thermal diffusion property and additionally extremely high conductivity, can express an additionally sufficient adhesive strength in its surface, and is additionally excellent in reworking property at the time of a bonding operation.

With regard to the shape of each of the above-mentioned carbon nanotubes, the lateral section of the nanotube has only to have any appropriate shape. The lateral section is of, for example, a substantially circular shape, an elliptical shape, or an n-gonal shape (where n represents an integer of 3 or more).

In the first preferred embodiment of the carbon nanotube aggregate of the present invention, both terminals of the carbon nanotube aggregate each have a shear adhesive strength for glass at 25° C. of preferably 20 to 500 N/cm$^2$, more preferably 30 to 100 N/cm$^2$, still more preferably 30 to 80 N/cm$^2$, particularly preferably 35 to 50 N/cm$^2$.

The specific surface area and density of the carbon nanotubes described above can each be set to any appropriate value.

Another preferred embodiment of the carbon nanotube aggregate of the present invention (which may hereinafter be referred to as "second preferred embodiment") is the following carbon nanotube aggregate where a plurality of carbon nanotubes each having a plurality of walls penetrate a resin layer in its thickness direction. Both terminals of the carbon nanotube aggregate each have a shear adhesive strength for glass at 25° C. of 15 N/cm$^2$ or more, the mode of the wall number distribution of the carbon nanotubes each having the plurality of walls is present at a wall number of 10 or less, and the relative frequency of the mode is 30% or more.

The distribution width of the wall number distribution of the carbon nanotubes each having the plurality of walls described above is more preferably 9 walls or less, still more preferably 1 to 9 walls, particularly preferably 2 to 8 walls, most preferably 3 to 8 walls.

The "distribution width" of the wall number distribution of the carbon nanotubes each having the plurality of walls described above refers to a difference between the maximum wall number and minimum wall number of the wall numbers of the carbon nanotubes each having the plurality of walls.

In the second preferred embodiment of the carbon nanotube aggregate of the present invention, the distribution width of the wall number distribution of the carbon nanotubes each having the plurality of walls falls within the above-mentioned range. As a result, the carbon nanotube aggregate can express additionally extremely high thermal diffusion property and additionally extremely high conductivity, can express an additionally sufficient adhesive strength in its surface, and is additionally excellent in reworking property at the time of a bonding operation.

The wall numbers and wall number distribution of the carbon nanotubes in the present invention have only to be measured with any appropriate apparatus. The measurement is preferably performed with a scanning electron microscope (SEM) or a transmission electron microscope (TEM). For example, at least ten, or preferably twenty or more, carbon nanotubes out of the carbon nanotube aggregate have only to be evaluated for their wall numbers and wall number distribution by measurement with the SEM or TEM.

The above-mentioned maximum wall number is preferably 1 to 20, more preferably 2 to 15, still more preferably 3 to 10. The above-mentioned minimum wall number is preferably 1 to 10, more preferably 1 to 5.

In the second preferred embodiment of the carbon nanotube aggregate of the present invention, the maximum wall number and minimum wall number of the wall numbers of the carbon nanotubes fall within the above-mentioned ranges. As a result, the carbon nanotube aggregate can express additionally extremely high thermal diffusion property and additionally extremely high conductivity, can express an additionally sufficient adhesive strength in its surface, and is additionally excellent in reworking property at the time of a bonding operation.

The relative frequency of the mode of the wall number distribution described above is more preferably 30 to 100%, still more preferably 30 to 90%, particularly preferably 30 to 80%, most preferably 30 to 70%.

In the second preferred embodiment of the carbon nanotube aggregate of the present invention, the relative frequency of the mode of the wall number distribution falls within the above-mentioned range. As a result, the carbon nanotube aggregate can express additionally extremely high thermal diffusion property and additionally extremely high conductivity, can express an additionally sufficient adhesive strength in its surface, and is additionally excellent in reworking property at the time of a bonding operation.

The mode of the wall number distribution described above is present within the wall number range of preferably 1 to 10, more preferably 2 to 8, still more preferably 2 to 6.

In the second preferred embodiment of the carbon nanotube aggregate of the present invention, the mode of the wall number distribution falls within the above-mentioned range. As a result, the carbon nanotube aggregate can express additionally extremely high thermal diffusion property and additionally extremely high conductivity, can express an additionally sufficient adhesive strength in its surface, and is additionally excellent in reworking property at the time of a bonding operation.

With regard to the shape of each of the above-mentioned carbon nanotubes, the lateral section of the nanotube has only to have any appropriate shape. The lateral section is of, for example, a substantially circular shape, an elliptical shape, or an n-gonal shape (where n represents an integer of 3 or more).

In the second preferred embodiment of the carbon nanotube aggregate of the present invention, with regard to the lengths of exposed portions (portions each represented by a reference numeral 11 in FIG. 1), the content of exposed portions each having a length of 500 μm or more in all the exposed portions is preferably 80 to 100%, more preferably 90 to 100%, still more preferably 95 to 100%, particularly preferably 98 to 100%, most preferably substantially 100%. The phrase "substantially 100%" as used herein refers to a state in which the content is 100% in a detection limit in a measuring instrument.

In the second preferred embodiment of the carbon nanotube aggregate of the present invention, the length of each of the exposed portions is particularly preferably 500 μm or more. When the length of each of the exposed portions is 500 μm or more, more specifically, the length is preferably 500 to 10,000 μm, more preferably 500 to 5,000 μm, still more preferably 500 to 2,000 μm, particularly preferably 500 to 1,000 μm.

In the second preferred embodiment of the carbon nanotube aggregate of the present invention, when the length of each of the exposed portions is less than 500 μm, the carbon nanotube aggregate of the present invention may be unable to express extremely high thermal diffusion property and extremely high conductivity, may be unable to express a sufficient adhesive strength in its surface, and may be poor in reworking property at the time of a bonding operation.

In the second preferred embodiment of the carbon nanotube aggregate of the present invention, both terminals of the carbon nanotube aggregate each have a shear adhesive strength for glass at 25° C. of preferably 20 to 500 N/cm$^2$, more preferably 30 to 100 N/cm$^2$, still more preferably 30 to 80 N/cm$^2$, particularly preferably 35 to 50 N/cm$^2$.

The specific surface area and density of the carbon nanotubes described above can each be set to any appropriate value.

[Method of Producing Carbon Nanotube Aggregate of the Present Invention]

Any appropriate method can be adopted as a method of producing a carbon nanotube aggregate of the present invention.

A preferred example of the method of producing a carbon nanotube aggregate of the present invention is a production method involving the following steps (1) to (7):

(1) the step of growing, on a substrate, a plurality of carbon nanotubes aligned in a substantially vertical fashion from the substrate;

(2) the step of crimping a protective sheet onto the terminal portions of the plurality of carbon nanotubes obtained on the substrate;

(3) the step of removing the substrate;

(4) the step of crimping a protective sheet onto the terminal portions of the plurality of carbon nanotubes exposed as a result of the removal of the substrate;

(5) the step of flowing curable resin syrup from the side surfaces of the carbon nanotubes both terminal portions of each of which are covered with the protective sheets to fill the gap;

(6) the step of curing the curable resin syrup by, for example, irradiation with UV light to form a resin layer; and (7) the step of removing the protective sheets.

In the method of producing a carbon nanotube aggregate of the present invention, any appropriate method can be adopted as a method of growing the plurality of carbon nanotubes on the substrate in the above-mentioned step (1).

The method is, for example, a method of producing an aggregate of carbon nanotubes aligned substantially perpendicularly from a smooth substrate by chemical vapor deposition (CVD) involving forming a catalyst layer on the substrate and filling a carbon source in a state in which a catalyst is activated with heat, plasma, or the like to grow the carbon nanotubes.

Any appropriate substrate can be adopted as the above-mentioned substrate. The substrate is, for example, a material having smoothness and high-temperature heat resistance enough to resist the production of the carbon nanotubes. Examples of such material include quartz glass, silicon (such as a silicon wafer), and a metal plate made of, for example, aluminum.

Figure 2:
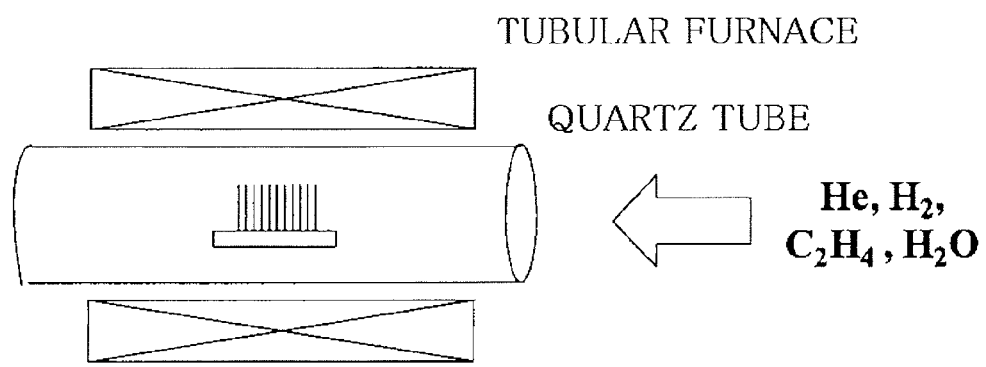
FIG. 2 is a schematic sectional view of an apparatus for producing a carbon nanotube aggregate in a preferred embodiment of the present invention.

Any appropriate apparatus can be adopted as an apparatus for growing the plurality of carbon nanotubes on the substrate. The apparatus is, for example, a thermal CVD apparatus of a hot wall type formed by surrounding a cylindrical reaction vessel with a resistance heating electric tubular furnace as illustrated in FIG. 2. In this case, for example, a heat-resistant quartz tube is preferably used as the reaction vessel.

Any appropriate catalyst can be used as the catalyst (material for the catalyst layer) that can be used for growing the plurality of carbon nanotubes on the substrate. Examples of the catalyst include metal catalysts such as iron, cobalt, nickel, gold, platinum, silver, and copper.

In growing the plurality of carbon nanotubes on the substrate, an alumina/hydrophilic film may be provided between the substrate and the catalyst layer as required.

Any appropriate method can be adopted as a method of producing the alumina/hydrophilic film.

For example, the film can be obtained by producing an SiO$_2$ film on the substrate, depositing Al from the vapor, and increasing the temperature of Al to 450° C. after the deposition to oxidize Al. According to such production method, $Al_2O_3$ interacts with the hydrophilic $SiO_2$ film, and hence an $Al_2O_3$ surface different from that obtained by directly depositing $Al_2O_3$ from the vapor in particle diameter is formed.

When Al is deposited from the vapor, and then its temperature is increased to 450° C. so that Al may be oxidized without the production of any hydrophilic film on the substrate, it may be difficult to form the $Al_2O_3$ surface having a different particle diameter. In addition, when the hydrophilic film is produced on the substrate and $Al_2O_3$ is directly deposited from the vapor, it may also be difficult to form the $Al_2O_3$ surface having a different particle diameter.

The catalyst layer that can be used for growing the plurality of carbon nanotubes on the substrate has a thickness of preferably 0.01 to 20 nm, more preferably 0.1 to 10 nm in order that fine particles may be formed. When the thickness of the catalyst layer that can be used for growing the plurality of carbon nanotubes on the substrate falls within the above-mentioned range, the carbon nanotube aggregate of the present invention to be obtained can express additionally extremely high thermal diffusion property and additionally extremely high conductivity, can express an additionally sufficient adhesive strength in its surface, and is additionally excellent in reworking property at the time of a bonding operation.

Any appropriate method can be adopted as a method of forming the catalyst layer. Examples of the method include a method involving depositing a metal catalyst from the vapor, for example, with an electron beam (EB) or by sputtering and a method involving applying a suspension of metal catalyst fine particles onto the substrate.

Any appropriate carbon source can be used as the carbon source that can be used for growing the plurality of carbon nanotubes on the substrate. Examples of the carbon source include: hydrocarbons such as methane, ethylene, acetylene, and benzene; and alcohols such as methanol and ethanol.

Any appropriate temperature can be adopted as a temperature for growing the plurality of carbon nanotubes on the substrate. For example, the temperature is preferably 400 to 1,000° C., more preferably 500 to 900° C., still more preferably 600 to 800° C. in order that catalyst particles allowing sufficient expression of an effect of the present invention may be formed.

Sheet-like products each formed of any appropriate material can be adopted as the above-mentioned protective sheets. Examples of the sheet-like products include a sheet and a tape each formed of a water-soluble material.

Curable resin syrup formed of any appropriate curable resin can be adopted as the above-mentioned curable resin syrup. Examples of the curable resin include a thermosetting resin and a photocurable resin (such as a UV-curable resin).

A sheet or tape formed of a water-soluble material is preferably adopted as each of the above-mentioned protective sheets upon production of the carbon nanotube aggregate of the present invention because the water-soluble protective sheets can be easily removed by water washing after the formation of the resin layer in the above-mentioned step (6).

[Thermal Diffusion Sheet and Conductive Sheet]

The carbon nanotube aggregate of the present invention can express extremely high thermal diffusion property and extremely high conductivity, can express a sufficient adhesive strength in its surface, and is excellent in reworking property at the time of a bonding operation. Therefore, the carbon nanotube aggregate is a composite material useful as a material for a thermal contact surface in a microprocessor.

The carbon nanotube aggregate of the present invention can be particularly preferably applied to a thermal diffusion sheet or a conductive sheet by virtue of the above-mentioned characteristics.

EXAMPLES

Hereinafter, the present invention is described on the basis of examples. However, the present invention is not limited by these examples. It should be noted that various evaluations and measurements were performed by the following methods.

<Evaluations for Wall Numbers and Wall Number Distribution of Carbon Nanotubes in Carbon Nanotube Aggregate>

The wall numbers and wall number distribution of the carbon nanotubes in the carbon nanotube aggregate of the present invention were measured with a scanning electron microscope (SEM) and/or a transmission electron microscope (TEM). At least ten, preferably twenty or more, carbon nanotubes in the resultant carbon nanotube aggregate were observed with the SEM and/or the TEM, the wall number of each carbon nanotube was examined, and the wall number distribution was created.

<Method of Measuring Shear Adhesive Strength for Glass of Carbon Nanotube Aggregate>

A carbon nanotube aggregate (carbon nanotube aggregate where a plurality of carbon nanotubes each having a plurality of walls penetrated a resin layer in its thickness direction) cut out so as to have a unit area of 1 $cm^2$ was mounted on a glass (MATSUNAMI slide glass 27 mm×56 mm) so that both terminals of each of the plurality of exposed carbon nanotubes in the carbon nanotube aggregate contacted the glass. Then, the tips of the carbon nanotubes were crimped onto the glass by reciprocating a 5-kg roller once. After that, the resultant was left to stand for 30 minutes. A shearing test was performed with a tensile tester (Instro Tensil Tester) at a tension speed of 50 mm/min at 25° C., and the resultant peak was defined as a shear adhesive strength for glass.

<Evaluation for Thermal Diffusion Property>

The measurement of a thermal diffusivity was performed as an evaluation for thermal diffusion property. Both terminals of each of a plurality of exposed carbon nanotubes in a carbon nanotube aggregate (carbon nanotube aggregate where the plurality of carbon nanotubes each having a plurality of walls penetrated a resin layer in its thickness direction) were brought into contact with a contact type thermal diffusivity-evaluating apparatus (Ai-Phase Mobile: manufactured by ai-Phase Co., Ltd.), and then the thermal diffusivity was measured with the apparatus (measurement conditions: 2.5 V, 40 to 60 Hz).

<Evaluation for Conductivity>

Figure 3:
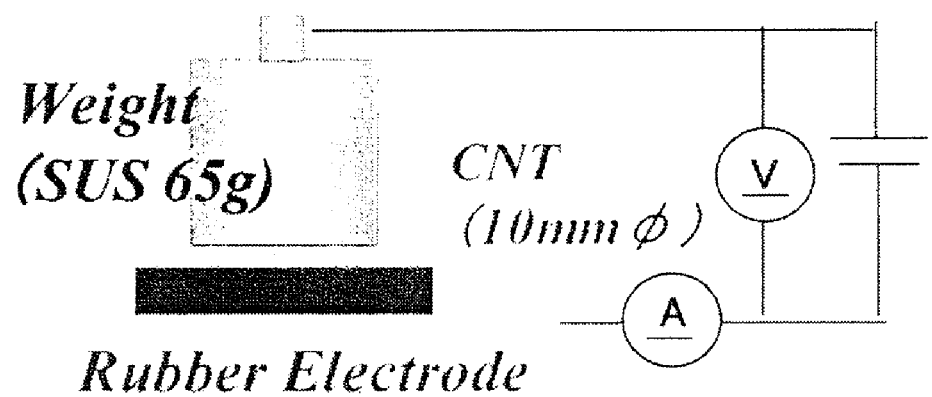
FIG. 3 is a schematic sectional view of an apparatus for measuring a volume resistivity.

The measurement of a volume resistivity was performed as an evaluation for conductivity. A volume resistivity in a vertical direction was measured with an apparatus illustrated in FIG. 3. That is, a carbon nanotube aggregate (carbon nanotube aggregate where a plurality of carbon nanotubes each having a plurality of walls penetrated a resin layer in its thickness direction) was cut out so as to have a diameter of 10 mm. Both terminals of each of the plurality of exposed carbon nanotubes in the carbon nanotube aggregate were sandwiched between conductive rubber electrodes (each containing Ag and each having a volume resistivity of $5.07 \times 10^{-3}$ Ω·cm), an SUS weight (65 g) was mounted on the upper rubber electrode, a voltage (1.0 V) was applied, and the volume resistivity (ρV) was determined from a current quantity (volume resistivity ρV (Ω·cm)=[voltage (V)/current (A)]× [area (cm$^2$)/thickness (cm)]).

Production Example 1

Preparation of UV-Curable Resin Syrup

UV-curable resin syrup was prepared by adding 0.05 part of an IRGACURE 651 (manufactured by Ciba Specialty Chemicals) and 0.05 part of an IRGACURE 184 (manufactured by Ciba Specialty Chemicals) as photopolymerization initiators to 100 parts of an EBECRYL 3701 (manufactured by DAICEL-CYTEC Company, Ltd.).

Example 1

An Al thin film (having a thickness of 10 nm) was formed on a silicon substrate (manufactured by ELECTRONICS AND MATERIALS CORPORATION, thickness: 525 μm) with a vacuum evaporator (manufactured by JEOL Ltd., JEE-4X Vacuum Evaporator). After that, the resultant was subjected to an oxidation treatment at 450° C. for 1 hour. Thus, an Al$_2$O$_3$ film was formed on the silicon substrate. An Fe thin film (having a thickness of 1 nm) was further deposited from the vapor onto the Al$_2$O$_3$ film with a sputtering apparatus (manufactured by ULVAC, Inc., RFS-200). Thus, a catalyst layer was formed.

Next, the silicon substrate with the catalyst layer was cut and mounted in a quartz tube having a diameter of 30 mm. A mixed gas of helium and hydrogen (120/80 sccm) with its moisture content kept at 350 ppm was flowed into the quartz tube for 30 minutes so that the air in the tube was replaced. After that, the temperature in the tube was increased to 765° C. with an electric tubular furnace in 35 minutes in a stepwise fashion, and was then stabilized at 765° C. After the tube had been left to stand at 765° C. for 10 minutes, a mixed gas of helium, hydrogen, and ethylene (105/80/15 sccm, moisture content: 350 ppm) was filled into the tube while the temperature was retained. Then, the tube was left to stand for 60 minutes so that carbon nanotubes were grown on the substrate.

The resultant carbon nanotubes (1C) each had a length of 1,350 μm.

Figure 4:
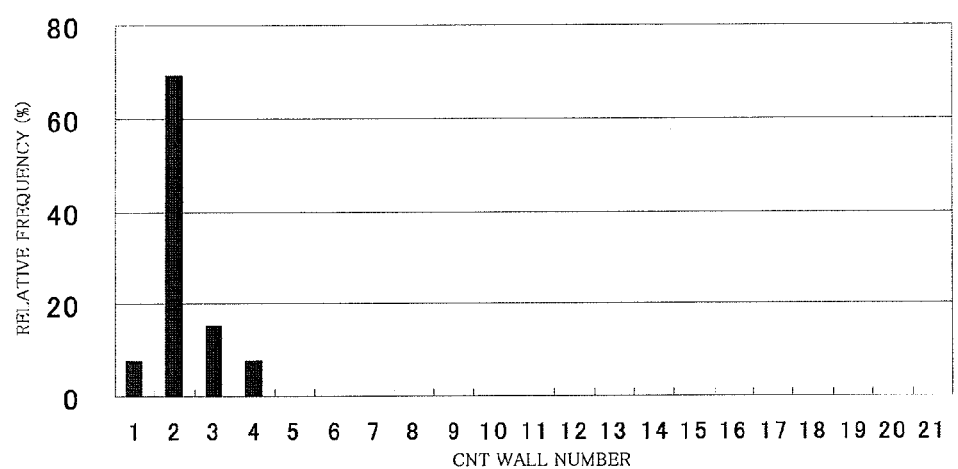
FIG. 4 is a view illustrating the wall number distribution of carbon nanotubes (1C) obtained in Example 1.

FIG. 4 illustrates the wall number distribution of the resultant carbon nanotubes (1C). As illustrated in FIG. 4, modes were present at 2 walls, and each had a relative frequency of 69%.

After one terminal of each of the resultant carbon nanotubes (1C) had been crimped onto a water-soluble double-faced tape (509A manufactured by Nitto Denko Corporation), the silicon substrate was peeled. Further, the other terminal of each of the carbon nanotubes (1C) that had appeared as a result of the peeling was crimped onto a water-soluble double-faced tape (509A manufactured by Nitto Denko Corporation). Thus, a structure in which both terminals of each of the carbon nanotubes (1C) were covered with the water-soluble double-faced tapes was obtained. After that, the UV-curable resin syrup prepared in Production Example 1 was flown from the side surface sides of the carbon nanotubes (1C), and was then irradiated with light from a mercury lamp (having an illuminance of 1 to 50 W) for 5 minutes so as to cure. Thus, a resin layer was formed.

The resultant structure formed of a configuration [water-soluble double-faced tape/carbon nanotube aggregate (carbon nanotube aggregate where the plurality of carbon nanotubes each having the plurality of walls penetrated the resin layer in its thickness direction)/water-soluble double-faced tape] was left to stand in distilled water, and the distilled water was sometimes stirred. After a lapse of 1 hour, the water-soluble double-faced tapes with which the carbon nanotube aggregate was covered were removed. Thus, a carbon nanotube aggregate (1) was obtained.

The carbon nanotube aggregate (1) was analyzed with an SEM. As a result, the resin layer had a thickness of 250 μm, and the lengths of the exposed portions of each carbon nanotube in both surfaces of the resin layer were 510 μm and 550 μm.

Table 1 summarizes the results.

Example 2

An Al thin film (having a thickness of 10 nm) was formed on a silicon substrate (wafer with a thermal oxide film, manufactured by KST, 1,000 μm) with a vacuum evaporator (manufactured by JEOL Ltd., JEE-4X Vacuum Evaporator). After that, the resultant was subjected to an oxidation treatment at 450° C. for 1 hour. Thus, an Al$_2$O$_3$ film was formed on the silicon substrate. An Fe thin film (having a thickness of 2 nm) was further deposited from the vapor onto the Al$_2$O$_3$ film with a sputtering apparatus (manufactured by ULVAC, Inc., RFS-200). Thus, a catalyst layer was formed.

Next, the silicon substrate with the catalyst layer was cut and mounted in a quartz tube having a diameter of 30 mm. A mixed gas of helium and hydrogen (120/80 sccm) with its moisture content kept at 350 ppm was flowed into the quartz tube for 30 minutes so that the air in the tube was replaced. After that, the temperature in the tube was increased to 765° C. with an electric tubular furnace in 35 minutes in a stepwise fashion, and was then stabilized at 765° C. After the tube had been left to stand at 765° C. for 10 minutes, a mixed gas of helium, hydrogen, and ethylene (105/80/15 sccm, moisture content: 350 ppm) was filled into the tube while the temperature was retained. Then, the tube was left to stand for 90 minutes so that carbon nanotubes were grown on the substrate.

The resultant carbon nanotubes (2C) each had a length of 980 μm.

Figure 5:
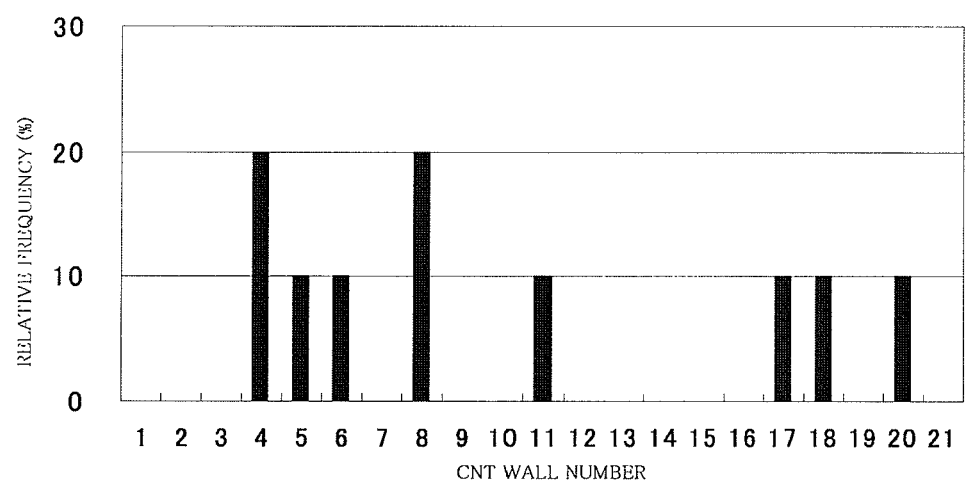
FIG. 5 is a view illustrating the wall number distribution of carbon nanotubes (2C) obtained in Example 2.

FIG. 5 illustrates the wall number distribution of the resultant carbon nanotubes (2C). As illustrated in FIG. 5, modes were present at 4 walls and 8 walls, and each had a relative frequency of 20%.

After one terminal of each of the resultant carbon nanotubes (2C) had been crimped onto a water-soluble double-faced tape (509A manufactured by Nitto Denko Corporation), the silicon substrate was peeled. Further, the other terminal of each of the carbon nanotubes (2C) that had appeared as a result of the peeling was crimped onto a water-soluble double-faced tape (509A manufactured by Nitto Denko Corporation). Thus, a structure in which both terminals of each of the carbon nanotubes (2C) were covered with the water-soluble double-faced tapes was obtained. After that, the UV-curable resin syrup prepared in Production Example 1 was flown from the side surface sides of the carbon nanotubes (2C), and was then irradiated with light from a mercury lamp (having an illuminance of 1 to 50 W) for 5 minutes so as to cure. Thus, a resin layer was formed.

The resultant structure formed of a configuration [water-soluble double-faced tape/carbon nanotube aggregate (carbon nanotube aggregate where the plurality of carbon nanotubes each having the plurality of walls penetrated the resin layer in its thickness direction)/water-soluble double-faced tape] was left to stand in distilled water, and the distilled water was sometimes stirred. After a lapse of 1 hour, the water-soluble double-faced tapes with which the carbon nanotube aggregate was covered were removed. Thus, a carbon nanotube aggregate (2) was obtained.

The carbon nanotube aggregate (2) was analyzed with an SEM. As a result, the resin layer had a thickness of 280 µm, and the lengths of the exposed portions of each carbon nanotube in both surfaces of the resin layer were 350 µm and 380 µm.

Table 1 summarizes the results.

Comparative Example 1

An Al thin film (having a thickness of 10 nm) was formed on a silicon substrate (manufactured by ELECTRONICS AND MATERIALS CORPORATION, thickness: 525 µm) with a vacuum evaporator (manufactured by JEOL Ltd., JEE-4X Vacuum Evaporator). After that, the resultant was subjected to an oxidation treatment at 450° C. for 1 hour. Thus, an $Al_2O_3$ film was formed on the silicon substrate. An Fe thin film (having a thickness of 1 nm) was further deposited from the vapor onto the $Al_2O_3$ film with a sputtering apparatus (manufactured by ULVAC, Inc., RFS-200). Thus, a catalyst layer was formed.

Next, the silicon substrate with the catalyst layer was cut and mounted in a quartz tube having a diameter of 30 mm. A mixed gas of helium and hydrogen (120/80 sccm) with its moisture content kept at 350 ppm was flowed into the quartz tube for 30 minutes so that the air in the tube was replaced. After that, the temperature in the tube was increased to 765° C. with an electric tubular furnace in 35 minutes in a stepwise fashion, and was then stabilized at 765° C. After the tube had been left to stand at 765° C. for 10 minutes, a mixed gas of helium, hydrogen, and ethylene (105/80/15 sccm, moisture content: 350 ppm) was filled into the tube while the temperature was retained. Then, the tube was left to stand for 30 minutes so that carbon nanotubes were grown on the substrate.

The resultant carbon nanotubes (C1C) each had a length of 565 µm.

Figure 6:
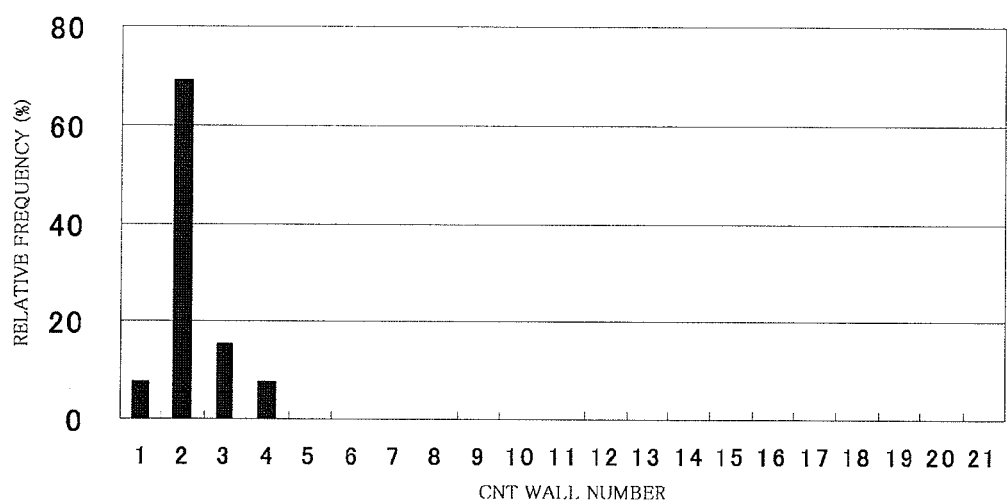
FIG. 6 is a view illustrating the wall number distribution of carbon nanotubes (C1C) obtained in Comparative Example 1.

FIG. 6 illustrates the wall number distribution of the resultant carbon nanotubes (C1C). As illustrated in FIG. 6, modes were present at 2 walls, and each had a relative frequency of 69%.

After one terminal of each of the resultant carbon nanotubes (C1C) had been crimped onto a water-soluble double-faced tape (509A manufactured by Nitto Denko Corporation), the silicon substrate was peeled. Further, the other terminal of each of the carbon nanotubes (C1C) that had appeared as a result of the peeling was crimped onto a water-soluble double-faced tape (509A manufactured by Nitto Denko Corporation). Thus, a structure in which both terminals of each of the carbon nanotubes (C1C) were covered with the water-soluble double-faced tapes was obtained. After that, the UV-curable resin syrup prepared in Production Example 1 was flown from the side surface sides of the carbon nanotubes (C1C), and was then irradiated with light from a mercury lamp (having an illuminance of 1 to 50 W) for 5 minutes so as to cure. Thus, a resin layer was formed.

The resultant structure formed of a configuration [water-soluble double-faced tape/carbon nanotube aggregate (carbon nanotube aggregate where the plurality of carbon nanotubes each having the plurality of walls penetrated the resin layer in its thickness direction)/water-soluble double-faced tape] was left to stand in distilled water, and the distilled water was sometimes stirred. After a lapse of 1 hour, the water-soluble double-faced tapes with which the carbon nanotube aggregate was covered were removed. Thus, a carbon nanotube aggregate (C1) was obtained.

The carbon nanotube aggregate (C1) was analyzed with an SEM. As a result, the resin layer had a thickness of 140 µm, and the lengths of the exposed portions of each carbon nanotube in both surfaces of the resin layer were 220 µm and 190 µm.

Table 1 summarizes the results.

Comparative Example 2

An Al thin film (having a thickness of 10 nm) was formed on a silicon substrate (wafer with a thermal oxide film, manufactured by KST, 1,000 µm) with a vacuum evaporator (manufactured by JEOL Ltd., JEE-4X Vacuum Evaporator). After that, the resultant was subjected to an oxidation treatment at 450° C. for 1 hour. Thus, an $Al_2O_3$ film was formed on the silicon substrate. An Fe thin film (having a thickness of 2 nm) was further deposited from the vapor onto the $Al_2O_3$ film with a sputtering apparatus (manufactured by ULVAC, Inc., RFS-200). Thus, a catalyst layer was formed.

Next, the silicon substrate with the catalyst layer was cut and mounted in a quartz tube having a diameter of 30 mm. A mixed gas of helium and hydrogen (120/80 sccm) with its moisture content kept at 350 ppm was flowed into the quartz tube for 30 minutes so that the air in the tube was replaced. After that, the temperature in the tube was increased to 765° C. with an electric tubular furnace in 35 minutes in a stepwise fashion, and was then stabilized at 765° C. After the tube had been left to stand at 765° C. for 10 minutes, a mixed gas of helium, hydrogen, and ethylene (105/80/15 sccm, moisture content: 350 ppm) was filled into the tube while the temperature was retained. Then, the tube was left to stand for 45 minutes so that carbon nanotubes were grown on the substrate.

The resultant carbon nanotubes (C2C) each had a length of 840 µm.

Figure 7:
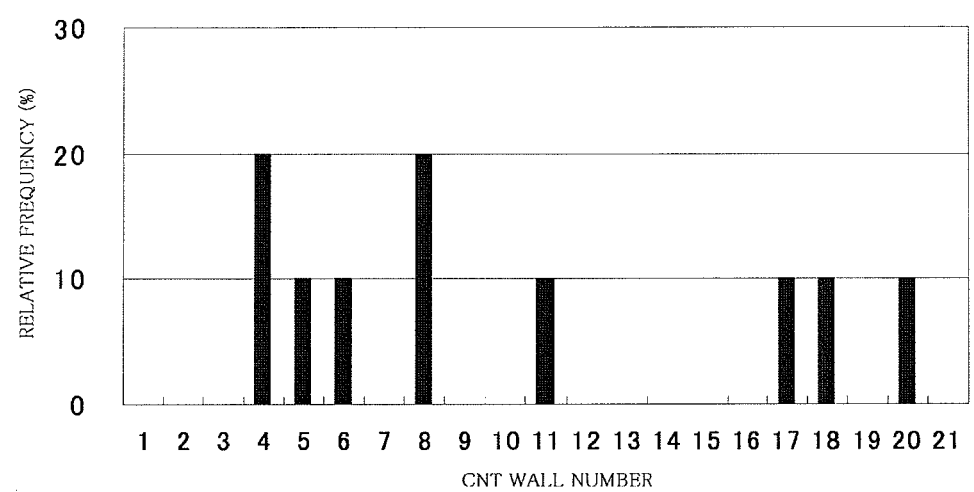
FIG. 7 is a view illustrating the wall number distribution of carbon nanotubes (C2C) obtained in Comparative Example 2.

FIG. 7 illustrates the wall number distribution of the resultant carbon nanotubes (C2C). As illustrated in FIG. 7, modes were present at 4 walls and 8 walls, and each had a relative frequency of 20%.

After one terminal of each of the resultant carbon nanotubes (C2C) had been crimped onto a water-soluble double-faced tape (509A manufactured by Nitto Denko Corporation), the silicon substrate was peeled. Further, the other terminal of each of the carbon nanotubes (C2C) that had appeared as a result of the peeling was crimped onto a water-soluble double-faced tape (509A manufactured by Nitto Denko Corporation). Thus, a structure in which both terminals of each of the carbon nanotubes (C2C) were covered with the water-soluble double-faced tapes was obtained. After that, the UV-curable resin syrup prepared in Production Example 1 was flown from the side surface sides of the carbon nanotubes (C2C), and was then irradiated with light from a mercury lamp (having an illuminance of 1 to 50 W) for 5 minutes so as to cure. Thus, a resin layer was formed.

The resultant structure formed of a configuration [water-soluble double-faced tape/carbon nanotube aggregate (carbon nanotube aggregate where the plurality of carbon nanotubes each having the plurality of walls penetrated the resin layer in its thickness direction)/water-soluble double-faced tape] was left to stand in distilled water, and the distilled water was sometimes stirred. After a lapse of 1 hour, the water-soluble double-faced tapes with which the carbon nanotube aggregate was covered were removed. Thus, a carbon nanotube aggregate (C2) was obtained.

The carbon nanotube aggregate (C2) was analyzed with an SEM. As a result, the resin layer had a thickness of 280 µm, and the lengths of the exposed portions of each carbon nanotube in both surfaces of the resin layer were 250 µm and 280 µm.

Table 1 summarizes the results.

TABLE 1

| | Distribution width of wall number distribution | Mode of wall number distribution (relative frequency) | Length of CNT (μm) | CNT exposed portion/resin layer/CNT exposed portion (μm) | Shear adhesive strength for glass at 25° C. (N/cm²) | Thermal diffusivity (×10⁴ m²/s) | Volume resistivity (Ω·cm) |
|---|---|---|---|---|---|---|---|
| Example 1 | 1-4 | 2 walls (69%) | 1,350 | 510/250/550 | 18.6 | 1.35 | 51.9 |
| Example 2 | 4-20 | 4 walls (20%) 8 walls (20%) | 980 | 350/280/380 | 42.0 | 1.71 | 72.3 |
| Comparative Example 1 | 1-4 | 2 walls (69%) | 565 | 220/140/190 | 5.7 | 0.095 | 8,200 |
| Comparative Example 2 | 4-20 | 4 walls (20%) 8 walls (20%) | 840 | 250/280/280 | 10.2 | 0.14 | 3,100 |

Example 1 shows an extremely large shear adhesive strength for glass at 25° C., an extremely large thermal diffusivity (extremely high thermal diffusion property), and an extremely small volume resistivity (extremely high conductivity) as compared with Comparative Example 1.

Example 2 shows an extremely large shear adhesive strength for glass at 25° C., an extremely large thermal diffusivity (extremely high thermal diffusion property), and an extremely small volume resistivity (extremely high conductivity) as compared with Comparative Example 2.

INDUSTRIAL APPLICABILITY

The carbon nanotube aggregate of the present invention is extremely useful as a material for a thermal contact surface in a microprocessor because the carbon nanotube aggregate can express extremely high thermal diffusion property and extremely high conductivity, can express a sufficient adhesive strength in its surface, and is excellent in reworking property at the time of a bonding operation.

REFERENCE SIGNS LIST

| | |
|---|---|
| 10 | carbon nanotube aggregate |
| 1 | carbon nanotube |
| 2 | resin layer |
| 11 | exposed portion |
| 12 | tip portion |

The invention claimed is:

1. A carbon nanotube aggregate where a plurality of carbon nanotubes each having a plurality of walls penetrate a resin layer in a thickness direction of the resin layer, wherein both terminals of the carbon nanotube aggregate are exposed and each have a shear adhesive strength for glass at 25° C. of 15 N/cm² or more, wherein exposed portions of the carbon nanotubes from the resin layer each have a length of 300 μm or more, and wherein a difference between the maximum wall number and minimum wall number of the wall numbers of the carbon nanotubes is 10 or more, and a relative frequency of a mode of the wall number distribution is 25% or less.

2. A carbon nanotube aggregate according to claim 1, wherein the mode of the wall number distribution is present within a wall number range of 2 to 10.

3. A carbon nanotube aggregate where a plurality of carbon nanotubes each having a plurality of walls penetrate a resin layer in a thickness direction of the resin layer, wherein both terminals of the carbon nanotube aggregate are exposed and each have a shear adhesive strength for glass at 25° C. of 15 N/cm² or more, wherein exposed portions of the carbon nanotubes from the resin layer each have a length of 300 μm or more, and wherein a mode of a wall number distribution of the carbon nanotubes each having the plurality of walls is present at a wall number of 10 or less, and a relative frequency of the mode is 30% or more.

4. A carbon nanotube aggregate according to claim 3, wherein the mode of the wall number distribution is present at a wall number of 6 or less.

5. A thermal diffusion sheet, using the carbon nanotube aggregate according to claim 1.

6. A conductive sheet, using the carbon nanotube aggregate according to claim 1.

7. A thermal diffusion sheet, using the carbon nanotube aggregate according to claim 3.

8. A conductive sheet, using the carbon nanotube aggregate according to claim 3.

* * * * *